United States Patent [19]
Nagata et al.

[11] Patent Number: 5,787,288
[45] Date of Patent: Jul. 28, 1998

[54] METHOD AND DEVICE FOR RENEWING AN INTERNAL PROGRAM OF AN APPARATUS HAVING COMMUNICATION CAPABILITY

[75] Inventors: Katsumi Nagata; Masahiro Inoue; Hiroaki Nakamura; Tetsuya Shibata, all of Osaka, Japan

[73] Assignee: Mita Industrial Co., Ltd., Osaka, Japan

[21] Appl. No.: 333,170

[22] Filed: Nov. 2, 1994

[30] Foreign Application Priority Data

Nov. 19, 1993 [JP] Japan .................... 5-290949

[51] Int. Cl.⁶ .................... G06F 7/00; G06F 9/00; G06F 13/00
[52] U.S. Cl. .................... 395/712
[58] Field of Search .................... 395/650, 700, 395/712, 653

[56] References Cited

U.S. PATENT DOCUMENTS

| | | | |
|---|---|---|---|
| 5,155,847 | 10/1992 | Kirouac | 395/712 |
| 5,321,840 | 6/1994 | Ahlin et al. | 395/712 |
| 5,430,877 | 7/1995 | Naylor | 395/653 |
| 5,454,067 | 9/1995 | Tsai | 395/106 |
| 5,530,862 | 6/1996 | Wadsworth et al. | 395/653 |

FOREIGN PATENT DOCUMENTS

| | | | |
|---|---|---|---|
| 0569178A2/3 | 11/1993 | European Pat. Off. | G06F 9/445 |
| 4248754 | 9/1992 | Japan . | |

OTHER PUBLICATIONS

Patent Abstracts of Japan vol. 017 No. 155 (M–1388), 26 Mar. 1993 & JP–A–04 323070 (Canon Inc) 12 Nov. 1992–abstract.

Patent Abstracts of Japan vol. 017 No. 022 (M–1307), 14 Jan. 1993 & JP–A–04 248754 (Canon Inc) 4 Sep. 1992–abstract.

Patent Abstracts of Japan vol. 017 No. 624 (P–1646), 17 Nov. 1993 & JP–A–05 197559 (Nec Corp) 6 Aug. 1993–abstract.

*Primary Examiner*—Emanuel Todd Voeltz
*Assistant Examiner*—John Q. Chavis
*Attorney, Agent, or Firm*—Jordan and Hamburg

[57] ABSTRACT

A method and device for renewing an internal program of an apparatus capable of communication with a central station operable to transmit a new apparatus control program. It is determined whether data received from the central station is a new program. Replacement is then executed of a previously stored program with the new program, if a new program is received. A previously stored internal program is automatically overwritten by a new program transmitted from the central station.

20 Claims, 8 Drawing Sheets

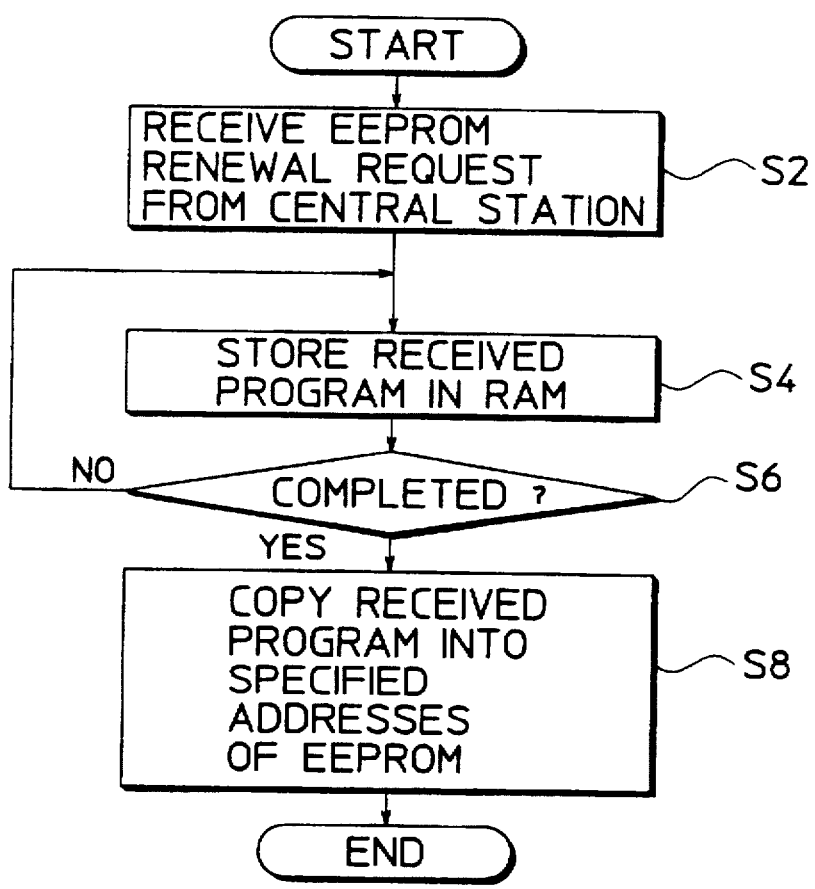

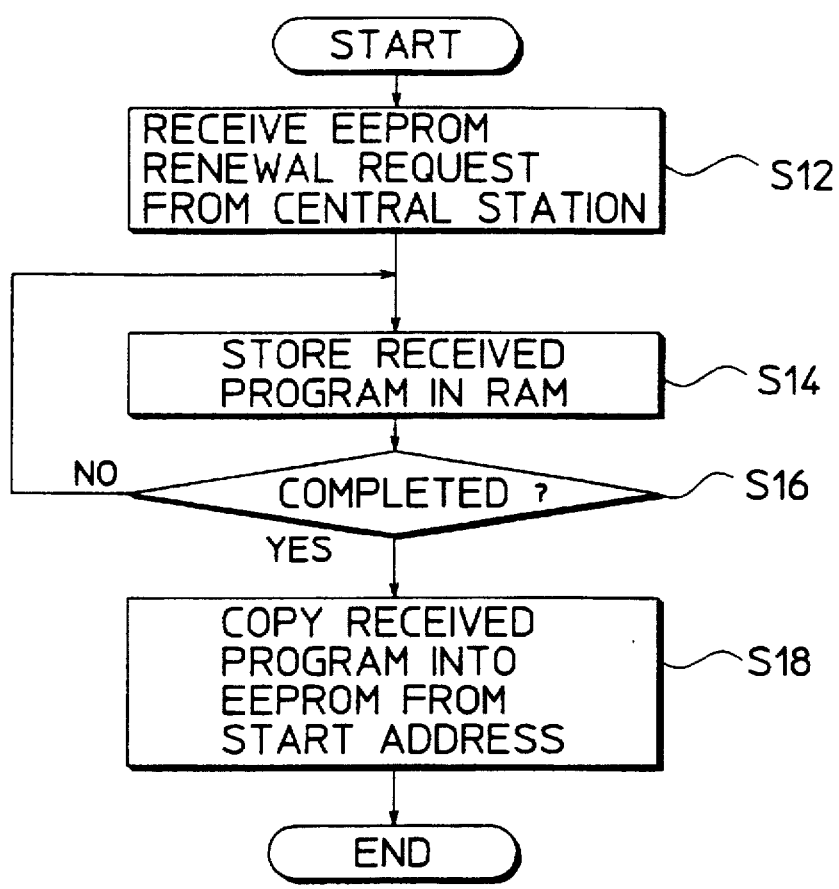

METHOD AND DEVICE FOR RENEWING AN INTERNAL PROGRAM OF AN APPARATUS HAVING COMMUNICATION CAPABILITY

BACKGROUND OF THE INVENTION

The present invention relates to an apparatus, such as facsimile machine, having communication capability, and in particular to a method and device for renewing a program previously stored in an internal program memory of a communication apparatus by overwriting an old program with a new program downloaded from a central station via a communication line.

Japanese Unexamined Patent Publication No. 4-248754 discloses a facsimile machine in which a diagnostic Program is loaded from external communication equipment into a writable memory of the machine. After executing a diagnostic test, the program is automatically abandoned or erased, regarding it as no longer necessary, to ensure effective use of the memory having a limited storage capacity.

Also, Japanese Unexamined Patent Publication No. 4-323070 discloses a printing machine in which a debugging program is loaded from a read-only-memory (ROM) card or from a host computer when a bug is found in a control program of the printing machine. After debugging the control program, it is stored in an electrically erasable programmable ROM (EEPROM) so that there is no need to replace an internal ROM for correcting a program bug.

In the above-mentioned facsimile machine, the diagnostic program or other add-on program for providing an extra function is temporarily written into a memory where facsimile image data is normally stored. It is therefore necessary to perform operations for data communication each time such a program is required. These operations are complicated and make it difficult to troubleshoot in a quick manner.

In the above-mentioned printing machine, because the debugging program is loaded from a ROM card or from a host computer, it is necessary to turn off the machine and have service personnel give debugging instructions each time a bug is found. Furthermore, since the program is specifically added for debugging purposes, it is written into extra addresses in the memory. This means that the memory must be provided with a spare capacity readily assigned to the debugging program and means for controlling individual tasks and address management. Moreover, it is necessary to prepare a dedicated ROM card for debugging or a host computer with a specially made debugging program and communication control software for controlling data transmission routine.

SUMMARY OF THE INVENTION

It is an object of the present invention to provide a method and device for renewing an internal program of an apparatus having communication capability.

It is another object of the present invention to provide an internal program renewing method and device which can facilitate a renewal operation of an internal program of an apparatus having communication capability, such as a facsimile machine, by the use of its inherent data communication capability.

The present invention is directed to a method for renewing a program stored in an internal program memory of an apparatus capable of communication with a central station, the central station being operable to transmit data concerning a program and other contents, the method comprises steps of: judging whether data transmitted from the central station is a new program; and replacing a previously stored program with the new program, if a new program is transmitted.

The method may further include a step of storing the data transmitted from the central station in a secondary memory provided in the apparatus. The judging step may be executed by judging whether the data stored in the secondary memory is a new program, and the replacing step may be executed by transferring the new program from the secondary memory to the internal program memory to replace the previously stored program with the new program.

In the case of the apparatus being a facsimile machine, the judging step may be executed based on an NSS signal transmitted from the central station prior to transmission of data.

Also, the present invention is directed to a device for renewing a program stored in an internal program memory of an apparatus capable of communication with a central station, the central station being operable to transmit data concerning a program and other contents, the device comprising: means for judging whether data transmitted from the central station is a new program; and means for replacing a previously stored program with the new program, if a new apparatus control program is transmitted.

The device may be further provided with a data memory for storing the data transmitted from the central station. The judging means may be made to judge whether the data stored in the data memory is a new program, and the replacing means may be made to transfer the new program from the data memory to the internal program memory to replace the previously stored program with the new program.

The device may be used for a facsimile machine. The judging means may be made to execute the judgment based on an NSS signal transmitted from the central station prior to transmission of data.

The internal program memory may be operable to store an apparatus control program for controlling the apparatus and a renewal program for controlling the judging means and the replacing means. The central station is operable to transmit data concerning a new apparatus control program.

The internal program memory may be constructed by a rewritable memory having a portion where the renewal program is written together with a write-inhibit code for inhibiting overwrite.

The internal program memory may be constructed by a unwritable memory for storing a renewal program, and a rewritable memory for storing an apparatus control program.

The internal program memory may be formed with two storage portions for storing an old apparatus control program and a new apparatus control program, respectively. The two storage portions may alternately store a transmitted new apparatus control program. Further, the internal program memory may be provided with a unwritable memory for storing the renewal program. The two storage portions may be two rewritable memories respectively, the renewal program being written in a portion of one rewritable memory together with a write-inhibit code for inhibiting overwrite.

In the case of the central station being operable to transmit data concerning a new renewal program in addition to a new apparatus program, the two storage portions may be constructed by two rewritable memories respectively, each having a portion for storing an apparatus control program and a renewal program. The two rewritable memories may be made to store a transmitted new apparatus control program and a transmitted new renewal program one after another.

Further, the device may be provided with means for maintaining the apparatus in a power on state during the renewal operation.

Accordingly, discrimination is executed between a new program downloaded from a central station via a communication line and other incoming data, such as facsimile image data. If a new program is transmitted, a previously stored program is automatically overwritten by the new program.

More specifically, it is determined whether data received from a central station is a new program when a communication request signal is received from the central station. If it is a new program, the replacement is started and the previously stored program is overwritten by the new program. As a result, the internal program of the apparatus is renewed easily and surely. This arrangement also provides increased maintainability, eliminating the need for dispatching service personnel for fault diagnosis. Furthermore, a conventional ROM card or other dedicated storage media will no longer be required for renewing the internal program.

If the apparatus is a facsimile machine, an NSS signal usable for setting a non-standard function is included in signals exchanged between the central station and facsimile machine prior to data transmission and is utilized to determine whether transmitted data is a new program. This eliminates the need for an additional signal for discriminating between image data transmission and program transmission.

The arrangement in which the internal program memory is made of a single memory serves to achieve compact design and cost reduction of the apparatus.

The arrangement in which the internal program memory is constructed by two memories and the replacement is alternately executed on the two memories each time a new apparatus control program is downloaded makes it possible to prevent the apparatus from becoming immediately unusable when a failure occurs in the apparatus, communication line or elsewhere during the program renewing since a previously stored apparatus control program still remains intact.

In the case where data transmitted from the central station includes both an apparatus control program and a renewal program, renewal programs in the two memories are alternately renewed. Accordingly it is possible to renew both an apparatus control program and a renewal program simultaneously.

Further, there is provided a means for keeping the apparatus in a power on state while the internal program is being renewed. Accordingly, the apparatus will not be powered off halfway during the program renewing process, and the renewing is thus safely completed.

Furthermore, if the central station registers and manages apparatus control programs for individual models of the apparatus, whenever the apparatus control program of a specific model is upgraded to a higher version the central station, establishes a communications link to individual apparatus of the relevant model and initiates downloading of the upgraded apparatus control program, the apparatus control program is renewed promptly and surely, and increased reliability of the apparatus is obtained with ease.

These and other objects, features and advantages of the invention will become more apparent upon a reading of the following detailed description of the preferred embodiments with reference to the appended drawings.

BRIEF DESCRIPTION OF THE DRAWINGS

FIG. 1A being a block diagram depicting a circuit configuration for renewing the apparatus control program, and FIG. 1B being a diagram showing a memory map of a ROM circuit;

FIG. 2 is a flowchart showing an apparatus control program renewal sequence of the first renewal circuit of FIGS. 1A and 1B;

FIG. 4 is a flowchart showing an apparatus control program renewal sequence of the second renewal circuit of FIGS. 3A and 3B;

FIG. 5A being a block diagram depicting a circuit configuration for renewing the apparatus control program, and FIG. 5B being a diagram showing a memory map of a ROM circuit;

DETAILED DESCRIPTION OF THE PREFERRED EMBODIMENTS OF THE INVENTION

Figure 8:
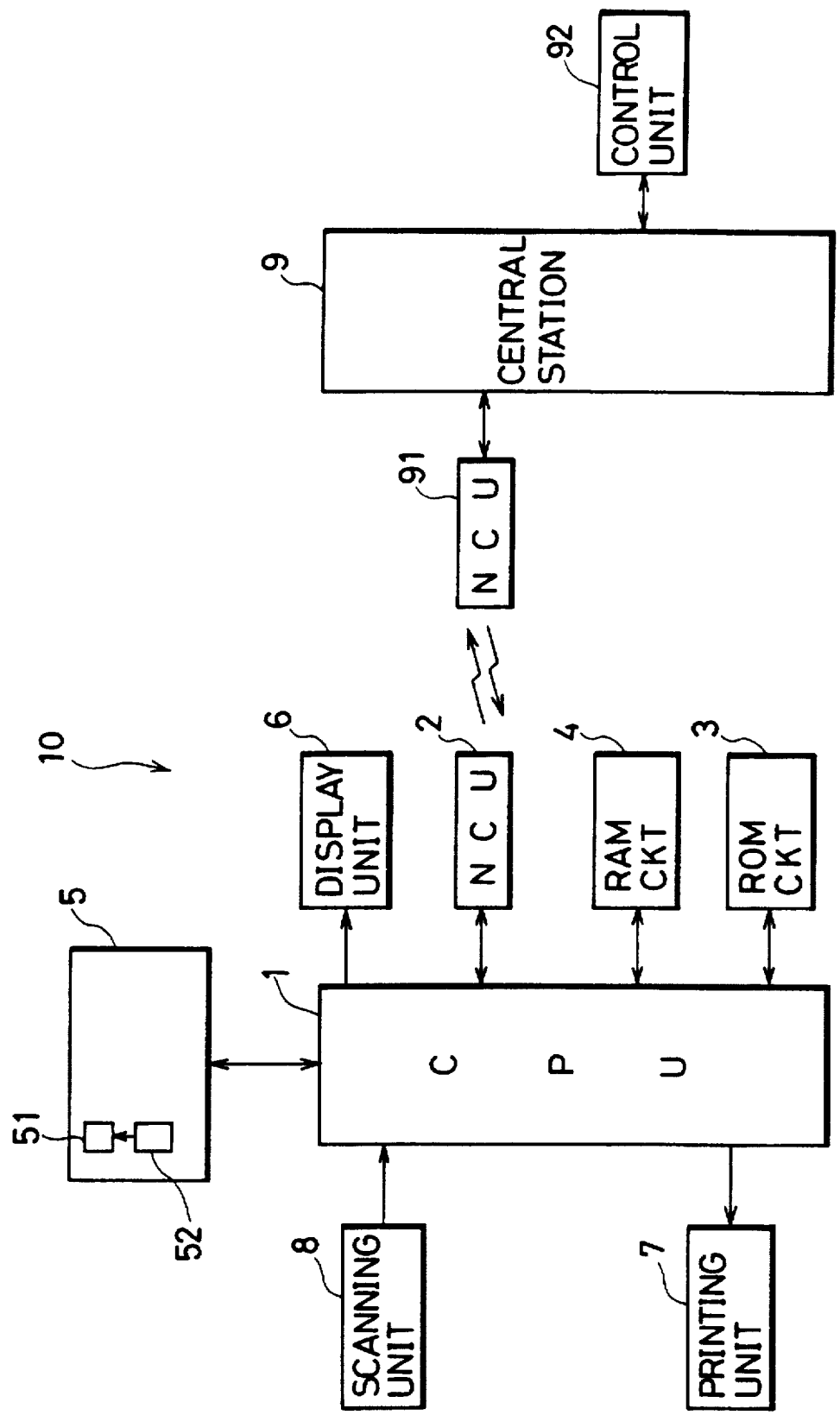
FIG. 8 is a diagram showing a communication system between the communication apparatus and a central station.

FIG. 8 is a diagram showing a communication system between a facsimile machine and a central station. It should be noted that a facsimile machine is an example of communication apparatus which the present invention is embodied for.

In FIG. 8, designated by the numeral 10 is a facsimile machine and designated by the numeral 9 is a central station. The central station 9 is provided with communication capability like the facsimile machine 10.

The facsimile machine 10 comprises a central processing unit (CPU) 1 for controlling overall operation of the facsimile machine 10, a network control unit (NCU) 2 for controlling connection to and disconnection from a public communications network, a ROM circuit 3 including a rewritable EEPROM in which a program for executing individual tasks of facsimile functions is written, a RAM circuit 4 including a static RAM (SRAM) and a dynamic RAM (DRAM) as shown in FIG. 1 for temporarily storing received image data or original image data to be transmitted as well as a downloaded apparatus control program, an operating panel 5 including numeric keys for entering a facsimile number, keys for initiating transmission, setting transmit/receive formats and so on and a power switch 51, a display unit 6 including a liquid crystal display (LCD) for indicating operating status, a printing unit 7 for printing a received image, and a scanning unit 8 for reading and converting an original image to be transmitted into electrical image data. A detailed description will be given for the ROM circuit 3 and RAM circuit 4 later in this specification.

As will be discussed later, the CPU 1 has a data discriminating function for determining whether received data is facsimile data sent from another facsimile machine or an apparatus control program sent from the central station 9. If the data is a downloaded apparatus control program, the CPU 1 writes it into the ROM circuit 3 to renew an existing apparatus control program.

Also, the CPU 1 ensures that the facsimile machine 10 remains powered on in certain situations. For this purpose, the facsimile machine 10 has the following arrangement. The power switch 51 of the operating panel 5 is a common mechanical switch, such as a push-button switch having up and down positions or a rocker switch, either of which includes a moving element.

The power switch 51 is associated with an electromagnetic lock mechanism 52 including a lock lever operated by a solenoid or a motor to protrude into or retract from where the moving element of the power switch 51 travels. With this arrangement, the power switch 51 is mechanically locked to an ON state while the solenoid (or motor) is activated even when an operator attempts to turn off the power switch 51.

Alternatively, the power switch 51 may be associated with a relay which, when activated, supplies power to the facsimile machine 10 regardless of ON/OFF states of the power switch 51. In another alternative arrangement, the display unit 6 or a separate warning indicator (unillustrated) may be used instead of or in addition to the electromagnetic lock mechanism 52 to alert that the apparatus control program is being renewed.

The printing unit 7 has a similar construction to an electrostatic copying machine comprising a photosensitive unit, a static charger, a developing unit, an image transfer unit, a fixing unit and a light source such as a laser or a light emitting array to reproduce a received image signal or a common computer printer provided with a printer head.

The scanning unit 8 comprises an array of image pickup elements for optically reading density variations on an original document and converting density information into an electric signal and a transport mechanism for feeding the original document to the scanning position.

The the central station 9 has its own NCU 91 for executing facsimile functions and a control unit 92 in which information on various models of facsimile machines and apparatus control programs for individual models are stored and managed in connection with individual facsimile numbers.

The central station 9 is also provided with means for registering apparatus control programs. When an apparatus control program of a certain model has been upgraded, the new version of the apparatus control program is registered into an internal memory of the control unit 92 for later management. In such a case, the central station 9 produces a list of user terminals of the relevant model of which apparatus control program should be renewed. Then, the central station 9 calls individual user terminals and transmits the upgraded apparatus control program via a communications network.

Given below is a brief description of a procedure for exchanging signals to be followed when the central station 9 (transmitter) calls the facsimile machine 10 (receiver) and renews its apparatus control program in accordance with the recommendations of the International Telegraph and Telephone Consultative Committee (CCITT).

When a communications link has been established, the facsimile machine 10, working as a receiver, transmits an NSF signal, a CS1 signal and a DIS signal containing status information indicating whether the facsimile machine 10 is ready to record incoming data as well as its facsimile number, paper size, etc. to the central station 9 working as a transmitter. In response to these signals, the transmitter returns a TSI signal, an NSS signal and a TCF signal containing information on the transmitter such as its facsimile number and data transmission rate to the receiver. When the data transmission rate coincides between both sides, the receiver sends a CFR signal and then the transmitter starts transmission of data. If the transmitter is another facsimile machine, image data is sent page by page separated by end-of-page (EOP) signals. If the transmitter is the central station 9, it sends an apparatus control program.

The NSS signal sent from the transmitter is usable for setting a non-standard function. Accordingly, this signal is preset to indicate that the transmitter is the central station 9 which will transmit an apparatus control program, or to include an identification signal which will make it possible to determine whether the transmitter is sending a control program or normal image data for facsimile if the transmitter can send both.

Figure 1A:
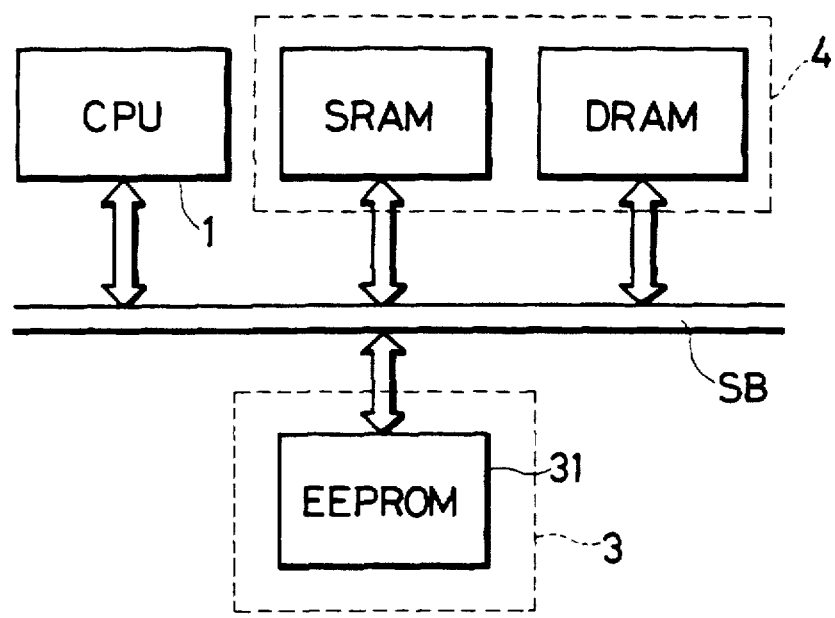
FIGS. 1A and 1B show a first embodiment of the present invention having a first circuit for renewing an apparatus control program.
Figure 1B:
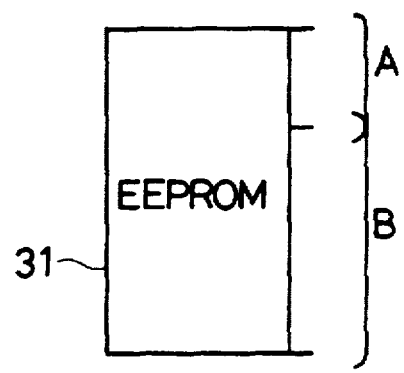

Referring to FIGS. 1A and 1B and 2, an apparatus control program renewal sequence according to a first embodiment of the invention is described. FIG. 1A is a block diagram depicting a circuit configuration for renewing the apparatus control program and FIG. 1B is a diagram showing a memory map of an EEPROM 31 contained in the ROM circuit 3. In FIGS. 1A and 1B circuit elements designated by like reference numerals as shown in FIG. 8 perform identical functions. The RAM circuit 4 of the first embodiment contains an SRAM and a DRAM.

In this embodiment, the ROM circuit 3 contains only one rewritable EEPROM 31, of which addresses are divided into two areas: a memory area A at the beginning of addresses and a memory area B in succeeding addresses as shown in the memory map of FIG. 1B. The memory area A stores a program renew utility which is used when renewing the apparatus control program together with a write-inhibit code (e.g., "1") while the memory area B stores the apparatus control program. The CPU 1 and other circuits are connected together via a system bus SB so that instructions and data can be transmitted. It is to be noted here that the allocation of addresses of the EEPROM 31 is not limited to what is described above. The memory area A may be allocated in any appropriate address range instead of at the beginning of the memory map.

FIG. 2 is a flowchart showing the apparatus control program renewal sequence of the first embodiment. First, it is determined whether the NSS signal from the central station 9 requests overwriting of the apparatus control program. If the received NSS signal requests program renewal (Step S2), the CPU 1 causes the RAM circuit 4 to once store a new apparatus control program that will be transmitted in succession into the SRAM or DRAM (Step S4). Upon receiving an EOP signal indicating the end of data transmission, the CPU 1 determines that the new apparatus control program is completely received (Yes in Step S6). Then, the new apparatus control program, temporarily stored in the RAM circuit 4, is transferred and written into the memory area B of the EEPROM 31 renewing the existing apparatus control program (Step S8). As seen above, the new apparatus control program downloaded from the central station is first stored in the RAM circuit 4 and upon completion of downloading the existing apparatus control program is renewed. This arrangement allows for sure reception and renewing of the apparatus control program.

Figure 3A:
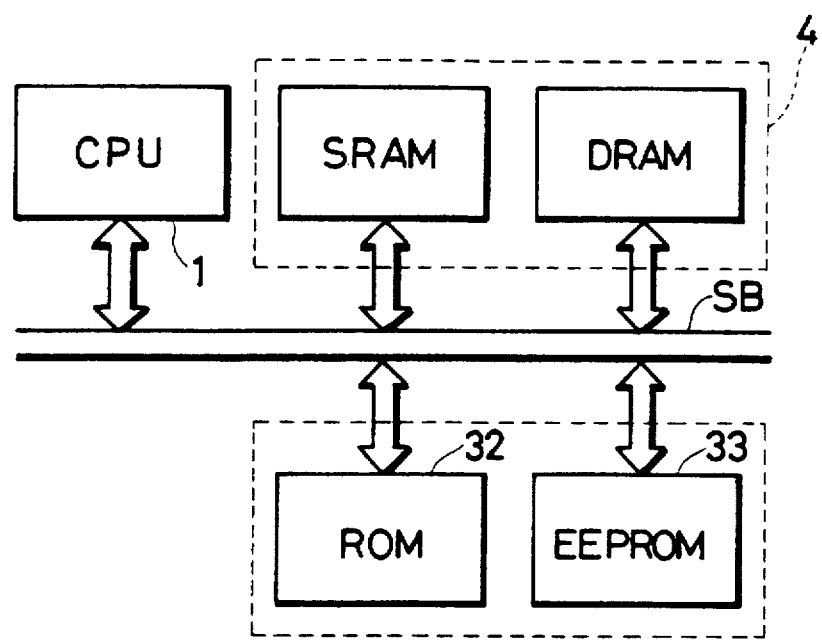
FIGS. 3A and 3B show a second circuit of a third embodiment of the present invention for renewing an apparatus control program, FIG. 3A being a block diagram depicting a circuit configuration for renewing the apparatus control program, and FIG. 3B being a diagram showing a memory map of a ROM circuit.
Figure 3B:
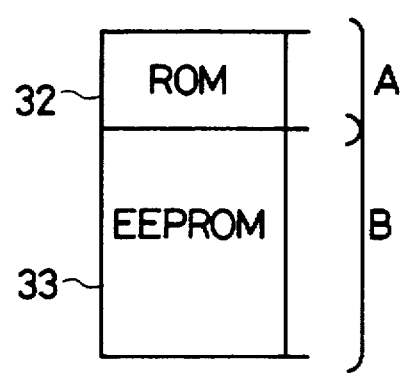

Referring now to FIGS. 3A and 3B and 4, an apparatus control program renewal sequence according to a second embodiment of the invention is described. FIG. 3A is a block diagram depicting a circuit configuration for renewing the apparatus control program and FIG. 3B is a diagram showing a memory map of the ROM circuit 3.

In this embodiment, the ROM circuit 3 comprises a ROM 32 for storing a renewal program and a rewritable EEPROM 33 in which the apparatus control program is registered.

FIG. 4 is a flowchart showing an apparatus control program renewal sequence of the second embodiment. First, it is determined whether the NSS signal from the central station 9 requests overwriting of the apparatus control program. If the received NSS signal requests program renewal (Step S12), the CPU 1 causes the RAM circuit 4 to first store a new apparatus control program that will be transmitted in succession (Step S14). Upon receiving an EOP signal indicating the end of data transmission, the CPU 1 determined that the new apparatus control program is completely received (Yes in Step S16). Then, the new apparatus control program, temporarily stored in the RAM circuit 4, is transferred and written into the EEPROM 33 from the beginning of its addresses renewing the existing apparatus control program (Step S18). As seen above, the whole memory capacity of the EEPROM 33 is used for storing the apparatus control program. This approach allows for effective use of the memory capacity and facilitates management of addresses when renewing the apparatus control program.

Figure 5A:
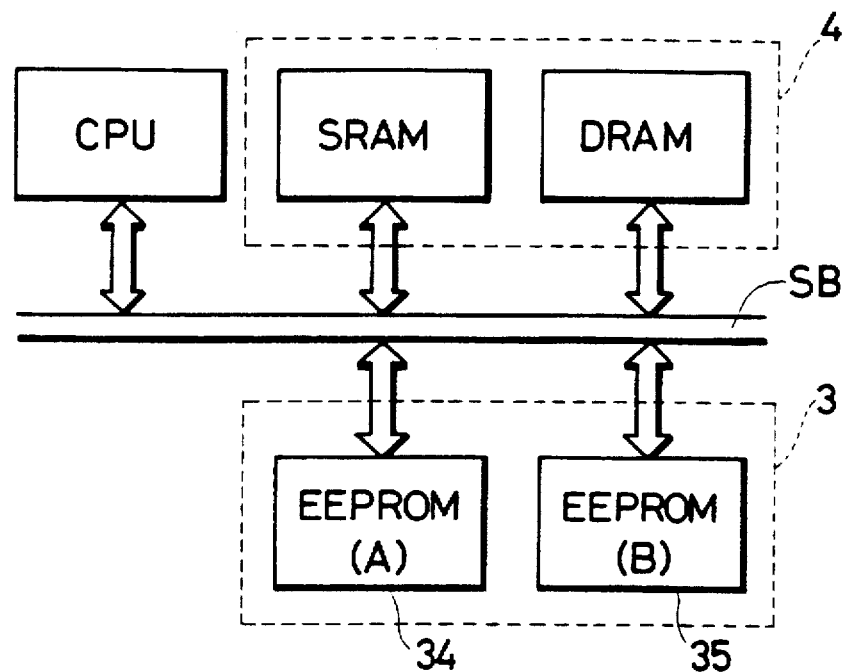
FIGS. 5A and 5B show a third circuit of a third embodiment of the present invention for renewing an apparatus control program.
Figure 5B:
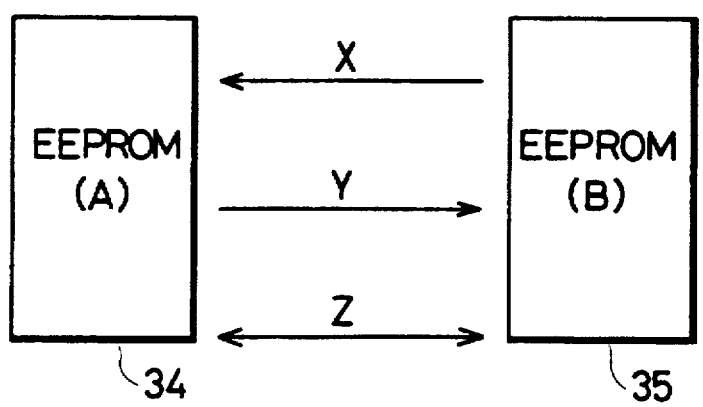
Figure 6:
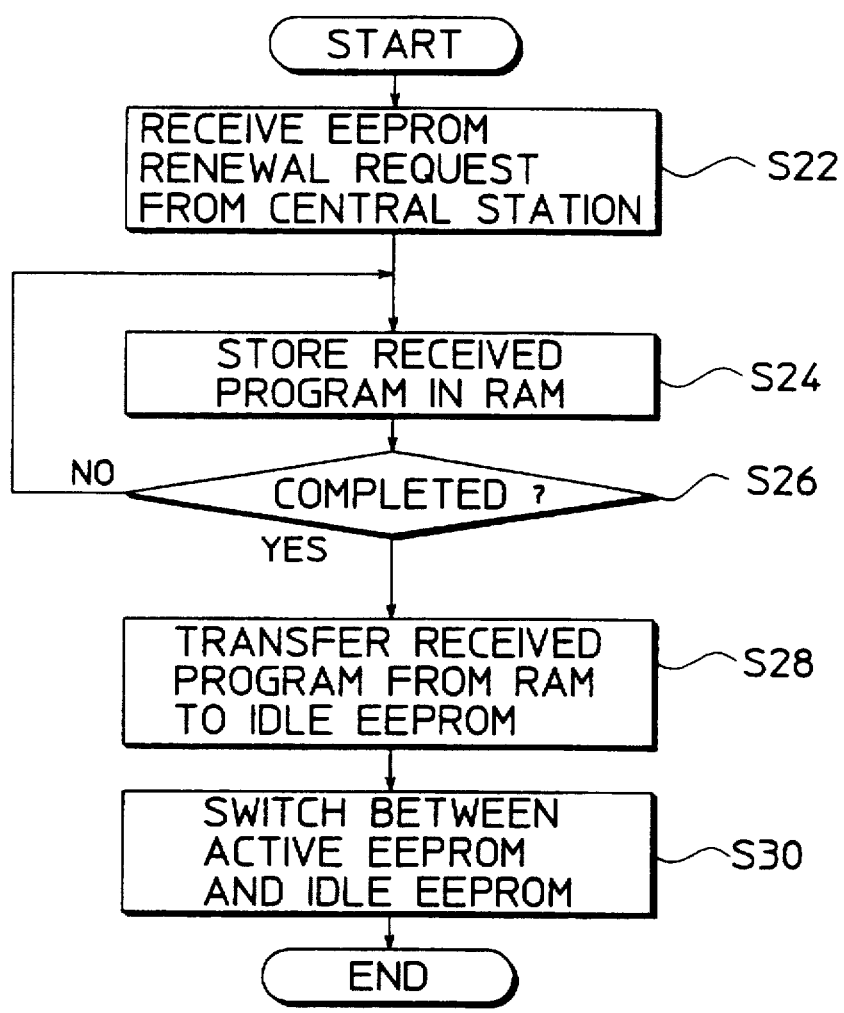
FIG. 6 is a flowchart showing an apparatus control program renewal sequence of the third circuit of FIGS. 5A and 5B.

Referring next to FIGS. 5A and 5B and 6, an apparatus control program renewal sequence according to a third embodiment of the invention is described. FIG. 5A is a block diagram depicting a circuit configuration for renewing the apparatus control program and FIG. 5B is a diagram showing a memory map of the ROM circuit 3.

In this embodiment, the ROM circuit 3 is rewritable, preferably comprising a pair of EEPROM's, EEPROM (A) 34 and EEPROM (B) 35, having the same storage capacity. Each EEPROM has two address ranges, i.e., a memory area A at the beginning of addresses and a memory area B in succeeding addresses. The memory area A stores a program renew utility which is used when renewing the apparatus control program together with a write-inhibit code (e.g., "1") while the memory area B stores the apparatus control program. Each time the central station 9 requests overwriting of the apparatus control program, a new apparatus control program is written into EEPROM (A) 34 or EEPROM (B) 35, whichever is not currently active. Then, the CPU 1 switches the active EEPROM to use the upgraded apparatus control program. In one variation of this embodiment, the program renew utility may be stored in only one of the two EEPROM's, whichever is preselected. In another variation of this embodiment, the renewal program may be stored in a separate ROM as described in the second embodiment. In this case, there may be provided only one ROM or two ROM's for EEPROM (A) 34 and EEPROM (B) 35. When there is provided only one ROM, its entire storage capacity may be commonly used for the apparatus control program renewal of EEPROM (A) 34 and EEPROM (B) 35 or divided into two address ranges to individually apparatus control program renewal of the two EEPROM's.

FIG. 6 is a flowchart showing an apparatus control program renewal sequence of the third embodiment. First, it is determined whether the NSS signal from the central station 9 requests overwriting of the apparatus control program. If the received NSS signal requests program renewal (Step S22), the CPU 1 causes the RAM circuit 4 to first store a new apparatus control program that will be transmitted in succession (Step S24). Upon receiving an EOP signal indicating the end of data transmission, the CPU 1 determines that the new apparatus control program is completely received (Yes in Step S26).

Subsequently, if the currently used or active apparatus control program is the one stored in EEPROM (A) 34, the new apparatus control program temporarily stored in the RAM circuit 4, is transferred and written into the memory area B of the currently unused or idle EEPROM (B) 35, renewing the apparatus control program existing therein (Step S28) as shown in the arrow X in FIG. 5B. Contrarily, if the currently used or active apparatus control program is the one stored in EEPROM (B) 35, the new apparatus control program is transferred and written into the memory area B of currently unused or idle EEPROM (A) 34, renewing the apparatus control program existing therein (Step S28) as shown in the arrow Y in FIG. 5B. Next, the CPU 1 switches between the active and idle EEPROM's so that the EEPROM containing the upgraded apparatus control program becomes active (Step S30) as shown in the arrow Z in FIG. 5B.

An advantage of this third embodiment is as follows. The CPU 1 may be programmed to detect a system error status and continue to use the currently running apparatus control program if the apparatus control program renewal sequence is interrupted halfway due to any problem in the facsimile machine 10 or in a communications link. With this arrangement, it is possible to prevent the facsimile machine 10 from becoming immediately unusable in the event of failure in program renewal. In this case the facsimile machine 10 may request the central station 9 to resend the apparatus control program using the NSS signal.

In the third embodiment described above, there is made no provision for renewing the renewal program itself stored in the memory area A of each EEPROM. If, however, the central station 9 can transmit both a new renewal program and apparatus control program, the facsimile machine 10 may be constructed in such a manner that the renewal program stored in the memory area A of the currently active EEPROM would renew the old renewal program and control program stored respectively in the memory areas A and B of the currently idle EEPROM with new ones. In this case, the renewal program is not written together with the write-inhibit code.

In any of the first to third embodiments described above, once the facsimile machine 10 is restarted after renewing the apparatus control program, it executes its tasks under the new apparatus control program.

Figure 7:
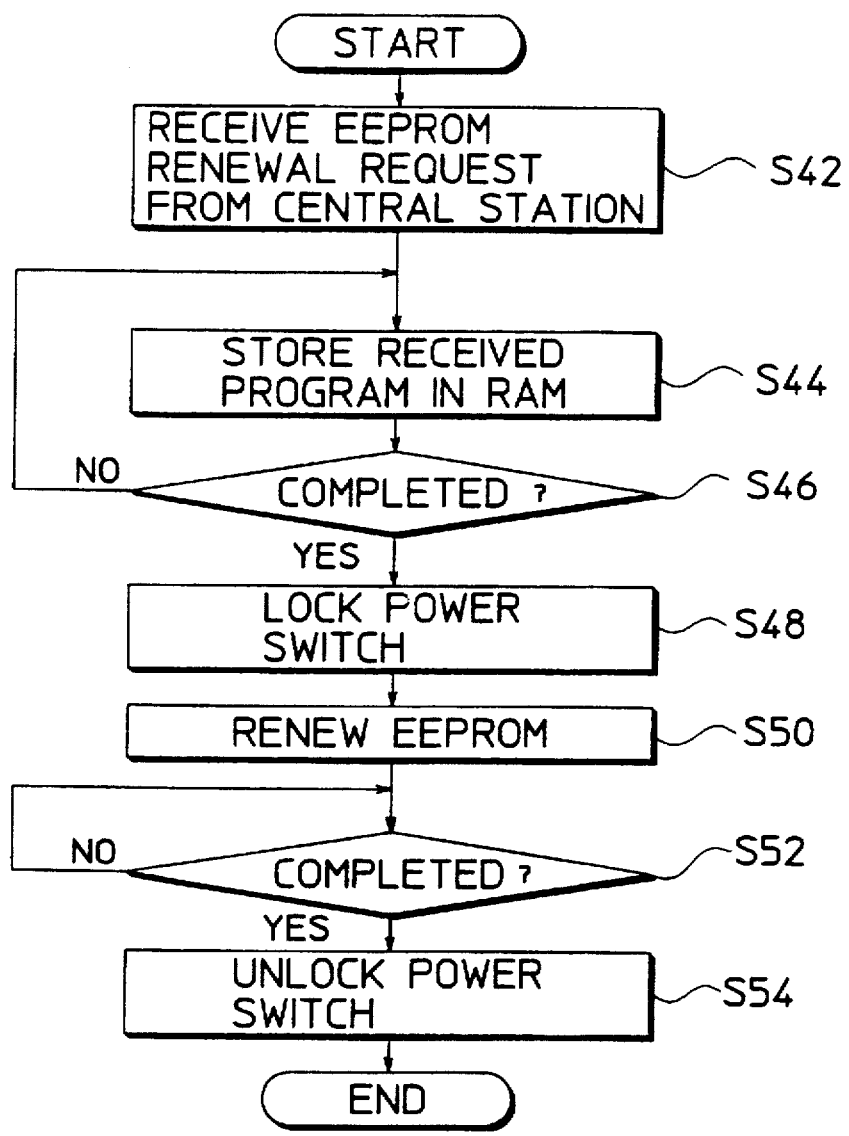
FIG. 7 is a flowchart showing a sequence for maintaining a communication apparatus powered on while it is connected to a central station.

FIG. 7 is a flowchart showing a sequence for maintaining the facsimile machine 10 in a power on state while it is connected to the central station 9. First, it is judged whether the NSS signal from the central station 9 requests overwriting of the apparatus control program. If the received NSS signal requests program renewal (Step S42), the CPU 1 causes the RAM circuit 4 to first store a new apparatus control program that will be transmitted in succession (Step S44). When the new apparatus control program has fully been received with an EOP signal which indicates the end of data transmission (Yes in Step S46), the electromagnetic lock mechanism 52 is activated and locks the power switch 51 (Step S48). Then, with the power switch 51 locked in the ON position, the new apparatus control program temporarily stored in the RAM circuit 4 is transferred and written into the memory area B of the EEPROM 31 (in the case of the first embodiment) renewing the existing apparatus control program (Step S50). When the program renewal is completed (Yes in Step S52), the power switch 51 is unlocked (Step S54). It is to be noted that this power lock sequence is applicable not only to the first embodiment but to the second and third embodiments. Also, the power lock sequence may be commenced from the point of time when renewing of the apparatus control program in the EEPROM is requested by the central station 9.

According to the invention described above, either the apparatus control program or the program renew utility received from the central station 9 is first stored in the RAM circuit 4 before they are written into the EEPROM. In a modified form of the invention, either of them may be directly downloaded from the central station 9 into the EEPROM without passing through the RAM circuit 4 to achieve time savings in program renewal.

Although the invention has been described with reference to several forms of preferred embodiments in a facsimile machine, it will be recognized by those skilled in the art that the invention is not limited to specific embodiments thereof but is applicable to a wide range of apparatus having communication capability that can transmit and receive information via a communication line and process or output the received information in a certain form.

What is claimed is:

1. A renewing method for renewing a previously stored control program stored in an internal program memory of an apparatus capable of communicating with a central station, the central station being operable to transmit data including a new control program and other contents, the renewing method comprising steps of:

establishing communication between said apparatus and said central station;

determining whether data transmitted from the central station is said new control program;

replacing said previously stored control program with said new control program following determining that said new control program is transmitted by the central station; and storing the data transmitted from the central station in a secondary memory of said apparatus;

the determining step determining whether the data stored in the secondary memory is said new control program; and the replacing step transferring the new control program from the secondary memory to the internal program memory to replace the previously stored control program with the new control program.

2. A renewing method as defined in claim 1, wherein the apparatus is a facsimile machine, and the determining step is executed based on an NSS signal transmitted from the central station prior to transmission of data.

3. A renewing device for renewing a previously stored control program stored in an internal program memory of an apparatus capable of communicating with a central station, the central station being operable to transmit data including control program data and other contents, the renewing device comprising:

means for communicating with and receiving data from said central station;

means for determining whether data transmitted from the central station is a new control program;

replacing means for replacing said previously stored control program in the internal program memory with the new control program following determining that the new control program is transmitted by said central station; and a data memory for storing the data transmitted from the central station, wherein:

the determining means is operable to judge whether the data stored in the data memory is a new control program; and the replacing means is operable to transfer the new control program from the data memory to the internal program memory to replace the previously stored control program with the control new program.

4. A renewing device as defined in claim 3, wherein the apparatus is a facsimile machine, and the determining means determines whether the data transmitted from the central station is a new control program based on an NSS signal transmitted from the central station prior to transmission of data.

5. A renewing device as defined in claim 3, wherein the internal program memory stores a control program for controlling the apparatus and a renewal program for controlling the determining means and the replacing means to replace said previously stored control program.

6. A renewing device as defined in claim 5 wherein the internal program memory is a rewritable memory, and the rewritable memory has a portion where the renewal program is written together with a write-inhibit code for inhibiting overwrite.

7. A renewing device as defined in claim 5, wherein the internal program memory includes:

a read only memory for permanently storing the renewal program; and a rewritable memory for storing the control program.

8. A renewing device as defined in claim 5, wherein the internal program memory includes a read only memory for permanently storing the renewal program and first and second portions for storing said previously stored control program and the new control program, respectively, and said renewing device further comprises storage control means for alternatingly storing successive control programs received from said central station in said first and second portions of said internal program memory.

9. A renewing device as defined in claim 5, wherein the internal program memory has first and second portions for storing said previously stored control program and the new control program, respectively.

10. A renewing device as defined in claim 9, wherein:

the central station is operable to transmit data including a new renewal program in addition to said new control program; and the first and second portions of said internal program memory are two rewritable memories respectively, each having a portion for storing the control program and the renewal program.

11. A renewing device as defined in claim 9, further comprising storage control means for alternatingly storing successive control programs received from said central station in said first and second portions of said internal program memory.

12. A renewing device as defined in claim 11, wherein the first and second portions of said internal program memory are rewritable memories, and the renewal program is written in a portion of one of said first and second portions with a write-inhibit code for inhibiting overwrite.

13. A renewing device for renewing a previously stored control program stored in an internal program memory of an apparatus capable of communicating with a central station, the central station being operable to transmit data including control program data and other contents, the renewing device comprising:

means for communicating with and receiving data from said central station;

means for determining whether data transmitted from the central station is a new control program;

replacing means for replacing said previously stored control program in the internal program memory with the new control program following determining that the new control program is transmitted by said central station;

the internal program memory storing a control program for controlling the apparatus and a renewal program for controlling the determining means and the replacing means to replace said previously stored control program;

the internal program memory having first and second portions for storing said previously stored control program and the new control program, respectively;

the central station being operable to transmit data including a new renewal program in addition to said new control program;

the first and second portions of said internal program memory being two rewritable memories respectively, each having a portion for storing the control program and the renewal program; and means for storing successively received control programs and renewal programs alternatingly in the first and second portions of the internal program memory such that a last previously written control program and a last previously written renewal program remain in one of said first and second portions for back-up operation.

14. A renewing device for renewing a previously stored control program stored in an internal program memory of an apparatus capable of communicating with a central station, the central station being operable to transmit data including control program data and other contents, the renewing device comprising means for communicating with and receiving data from said central station;

means for determining whether data transmitted from the central station is a new control program;

replacing means for replacing said previously stored control program in the internal program memory with the new control program following determining that a new control program is transmitted by said central station; and means for maintaining the apparatus in a power on state during a renewal operation for writing said control program into said internal program memory.

15. The method according to claim 1 wherein said replacing includes:

executing said storing of said new control program in said secondary memory as said central station transmits said new control program;

verifying that transmission of said new control program is completed; and executing said replacing step following verification that transmission of said new control program is complete.

16. A programming system for reprogramming an apparatus from a central station, comprising:

means for transmitting data between said apparatus and said central station;

said central station having means for initiating communication with said apparatus for transferring a control program to said apparatus preceded by a control program identifier code;

said apparatus including:

a first non-volatile memory which is reprogrammable for storing a control program;

a second non-volatile memory for storing a renewal program for updating said control program stored in said first non-volatile memory;

recognizing means for recognizing said control program identifier code as indicating a new control program is to be transmitted when said central station transmits said control program identifier;

a RAM;

storing means for storing said new control program in said RAM during reception of said new control program when said recognizing means recognizes said control program identifier code; and replacing means for transferring said new control program stored in said RAM to said first non-volatile memory.

17. The programming system according to claim 16 further comprising:

said second non-volatile memory for storing said renewal program being reprogrammable; and means for receiving a new renewal program from said central station and replacing said renewal program in said second non-volatile memory with a renewal program received from said central station.

18. A programming system for reprogramming an apparatus from a central station, comprising:

means for transmitting data between said apparatus and said central station;

said central station having means for initiating communication with said apparatus for transferring a control program to said apparatus preceded by a control program identifier code;

said apparatus including:

first and second non-volatile memories which are reprogrammable for storing a control program in each;

a third non-volatile memory for storing a renewal program for updating said control program stored in said first and second non-volatile memory;

recognizing means for recognizing said control program identifier code when said central station transmits said control program identifier;

a RAM;

storing means for storing said control program in a RAM during reception of said control program when said recognizing means recognizes said control program identifier code in accordance with said renewal program;

replacing means for transferring successively received control programs stored in said RAM alternatingly to one of said first and second non-volatile memories such that a last stored control program remains in another one of said first and second memories for back-up operation; and means for selecting said control program stored in said one of said first and second non-volatile memories for subsequent control of said apparatus and means for selecting said last stored control program stored in said another one of said first and second nonvolatile memories for back-up operation.

19. A renewing device for renewing a previously stored control program stored in an internal program memory of an apparatus capable of communicating with a central station, the central station being operable to transmit data including control program data and other contents, the renewing device comprising:

means for communicating with and receiving data from said central station;

means for determining whether data transmitted from the central station is a new control program;

replacing means for replacing said previously stored control program in the internal program memory with the new control program following determining that the new control program is transmitted by said central station;

the internal program memory having first and second portions for storing said previously stored control program and the new control program, respectively; and means for storing successively received control programs alternatingly in the first and second portions of the internal program memory such that a last previously written control program remains in one of said first and second portions for back-up operation.

20. A renewing device for renewing a previously stored control program stored in an internal program memory of an apparatus capable of communicating with a central station, the central station being operable to transmit data including control program data and other contents, the renewing device comprising means for communicating with and receiving data from said central station;

means for determining whether data transmitted from the central station is a new control program;

replacing means for replacing said previously stored control program in the internal program memory with the new control program following determining that a new control program is transmitted by said central station; and means for maintaining the apparatus in a power on state while said replacing means replaces said previously stored control program with said new control program.

* * * * *